United States Patent [19]

Ishizuka et al.

[11] Patent Number: 4,884,233

[45] Date of Patent: Nov. 28, 1989

[54] FAST SUMMING CIRCUIT

[75] Inventors: Akira Ishizuka, Tokyo; Toshihiko Nakamura, Yamanashi, both of Japan

[73] Assignee: NEC Corporation, Tokyo, Japan

[21] Appl. No.: 207,110

[22] Filed: Jun. 14, 1988

[30] Foreign Application Priority Data

Jun. 15, 1987 [JP] Japan ............................... 62-148791
Jun. 15, 1987 [JP] Japan ............................... 62-148792

[51] Int. Cl.$^4$ .............................................. G06F 7/50
[52] U.S. Cl. ................................................. 364/786
[58] Field of Search ................................ 364/784–788, 364/754, 757–760

[56] References Cited

U.S. PATENT DOCUMENTS 4,041,296 8/1977 Dauby et al. ...................... 364/757
4,598,382 7/1986 Sato ................................... 364/757

OTHER PUBLICATIONS

C. S. Wallace, "A Suggestion for a Fast Multiplier*" IEEE Transactions on Electronic Computers, Feb. 1987, pp. 14–17.

Primary Examiner—David L. Clark
Assistant Examiner—Long T. Nguyen
Attorney, Agent, or Firm—Foley & Lardner, Schwartz, Jeffery, Schwaab, Mack, Blumenthal & Evans

[57] ABSTRACT

A summing circuit (20) is for summing up zeroth through n-th input data signals A(0) to A(n) to produce a sum signal S consisting of zeroth through m-th output bits s(0) to s(m) where n represents a first predetermined natural number and m represents a second predetermined natural number which is not less than the first predetermined natural number. A preprocessing circuit (22) preprocesses the zeroth through the n-th input data signals A(0) to A(n) into a preprocessed signal which is (n+1) bits long. A logic circuit (24) carries out a logical operation on the preprocessed signal to produce the sum signal S. For example, each of the zeroth through the n-th input data signals A(0) to A(n) is given by an equation:

$$A(d) = a(d) \times \sum_{i=d}^{n} 2^{i+k} + A \times \sum_{i=0}^{k+d-1} 2^i,$$

where a(d) represents a d-th coefficient having one of logic zero and one values, k represents a predetermined integer which is not less than zero, and A represents a common coefficient having the logic zero value. Each of the zeroth through the n-th input data signals A(0) to A(n) may be given by another equation:

$$A(d) = a(d) \times \sum_{i=p(d)}^{m} 2^{i+k} + A \times \sum_{i=0}^{k+p(d)-1} 2^i,$$

where p(d)'s represent zeroth through n-th discrete integers.

7 Claims, 9 Drawing Sheets

| A(0) | a(0) | a(0) | a(0) | a(0) | a(0) | a(0) | a(0) | a(0) |
|---|---|---|---|---|---|---|---|---|
| A(1) | a(1) | a(1) | a(1) | a(1) | a(1) | a(1) | a(1) | 0 |
| A(2) | a(2) | a(2) | a(2) | a(2) | a(2) | a(2) | 0 | 0 |
| A(3) | a(3) | a(3) | a(3) | a(3) | a(3) | 0 | 0 | 0 |
| A(4) | a(4) | a(4) | a(4) | a(4) | 0 | 0 | 0 | 0 |
| A(5) | a(5) | a(5) | a(5) | 0 | 0 | 0 | 0 | 0 |
| A(6) | a(6) | a(6) | 0 | 0 | 0 | 0 | 0 | 0 |
| A(7) | a(7) | 0 | 0 | 0 | 0 | 0 | 0 | 0 |

FIG. 2

| A(0) | a(0) | a(0) | a(0) | a(0) | a(0) | a(0) | a(0) | a(0) |
|---|---|---|---|---|---|---|---|---|
| A(1) | a(1) | a(1) | a(1) | a(1) | a(1) | a(1) | a(1) | 0 |

↓

| A(0)+A(1) | $s'(7)$ | $s'(6)$ | $s'(5)$ | $s'(4)$ | $s'(3)$ | $s'(2)$ | $s'(1)$ | $s'(0)$ |
|---|---|---|---|---|---|---|---|---|

FIG. 3

| A(0)+A(1) | $s'(7)$ | $s'(6)$ | $s'(5)$ | $s'(4)$ | $s'(3)$ | $s'(2)$ | $s'(1)$ | $s'(0)$ |
|---|---|---|---|---|---|---|---|---|
| A(2) | a(2) | a(2) | a(2) | a(2) | a(2) | a(2) | 0 | 0 |

↓

| A(0)+A(1)+A(2) | $s''(7)$ | $s''(6)$ | $s''(5)$ | $s''(4)$ | $s''(3)$ | $s''(2)$ | $s''(1)$ | $s''(0)$ |
|---|---|---|---|---|---|---|---|---|

FIG. 4

```
                1 1 1 1 1 1 1 1 1 0 1 1 0 1 1    MULTIPLICAND
             x  1 1 1 1 1 1 1 1 0 1 1 0 1 1 0    MULTIPLIER
                0 0 0 0 0 0 0 0 0 0 0 0 0 0 0  ⎫
                1 1 1 1 1 1 1 1 1 0 1 1 0 1 1
                1 1 1 1 1 1 1 1 0 1 1 0 1 1
                0 0 0 0 0 0 0 0 0 0 0 0
                1 1 1 1 1 0 1 1 0 1 1
                1 1 1 1 0 1 1 0 1 1
                0 0 0 0 0 0 0 0 0                 PARTIAL
                1 1 1 0 1 1 0 1 1               ⎬ PRODUCTS
                1 1 0 1 1 0 1 1
                1 0 1 1 0 1 1
                0 1 1 0 1 1
                1 1 0 1 1
                1 0 1 1
                0 1 1
                1 1
                1                                ⎭
```

FIG.6

```
s(9)s(8)s(7)s(6)s(5)s(4)s(3)s(2)s(1)s(0)
  ┌─────────────────────────────┐
  │ 0  0  0  1  0  0  1  0  1  0│ 0 0 0 0 0 0
  └─────────────────────────────┘    0 1 1 0 1 1
                                  0 1 1 0 1 1
                               0 0 0 0 0 0
                            0 1 1 0 1 1
                         0 1 1 0 1 1
                      0 0 0 0 0 0
                   0 1 1 0 1 1
                0 1 1 0 1 1
             0 1 1 0 1 1
          0 1 1 0 1 1
          1 1 0 1 1
          1 0 1 1
          0 1 1
          1 1
       +  1
          ─────────────────────────────────
          0 0 0 0 1 0 1 0 1 0 1 1 0 0 1 0   PRODUCT
```

FIG.7

FIG.10
FIG.11

FIG.12
FIG.13

FAST SUMMING CIRCUIT

BACKGROUND OF THE INVENTION:

This invention relates to a summing circuit, and more particularly, to a binary summing circuit for use in carrying out multiplication of two binary numbers Multiplication of two binary numbers is normally carried out as addition of a number of summands which include, for example, zeroth through n-th input data signals, where n represents a first predetermined natural number. Each of the zeroth through the n-th input data signals is, for example, $(m+k+1)$ bits long, where m represents a second predetermined natural number which is not less than the first predetermined natural number n and k represents a predetermined integer which is not less than zero.

In order to sum up the zeroth through the n-th input data signals, a summing circuit is already known By way of example, a known summing circuit is described by C. S. Wallace to IEEE TRANSACTION ON ELECTRONIC COMPUTERS, February 1964, pages 14 to 17, under the title of "A Suggestion for a Fast Multiplier". The known summing circuit comprises a carry save adder tree circuit and a carry propagate adder (CPA). The carry save adder tree circuit comprises a number of carry save adders (CSA's) and sums up the zeroth through the n-th input data signals to produce two intermediate results of summation. The carry propagate adder adds the two intermediate results together to produce a final result of the summation as a sum signal. Each of the carry save adders consists of full adders which are equal in number to the second predetermined natural number plus one, namely, $(m+1)$. The carry propagate adder includes a carry look ahead (CLA) circuit for generating a carry data signal and produces the sum signal with reference to the carry data signal.

In the known summing circuit, the carry save adder tree circuit is composed in dependence upon the first and the second predetermined natural numbers n and m. As a result, the known summing circuit is disadvantageous in that an increased number of full adders are necessary when the first and the second predetermined natural numbers n and m increase. In addition, the carry propagate adder consumes a large add time.

SUMMARY OF THE INVENTION:

It is an object of this invention to provide a summing circuit which is operable at a high speed.

It is another object of this invention to provide a summing circuit of the type described, which is simple in structure.

A summing circuit to which this invention is applicable, is for summing up zeroth through n-th input data signals to produce a sum signal, where n represents a first predetermined natural number. Each of the zeroth through n-th input data signals consists of $(m+k+1)$ bits arranged from a most significant bit $2^{m+k}$ to a least significant bit $2^0$, where m represents a second predetermined natural number which is not less than the first predetermined natural number and k represents a predetermined integer which is not less than zero. The sum signal consists of $(m+1)$ bits arranged from the most significant bit $2^{m+k}$ to a k-th bit $2^k$ as counted from the least significant bit $2^0$. According to this invention, the summing circuit comprises preprocessing means responsive to the zeroth through the n-th input data signals for preprocessing the zeroth through the n-th input data signals to a preprocessed signal which is $(n+1)$ bits arranged from a most significant bit $2^n$ to a least significant bit $2^0$, said least through said most significant bits $2^0$ to $2^n$ of the preprocessed signal being equal to the most significant bits $2^{m+k}$ of said zeroth through said n-th input data signals, respectively, and logical operation means coupled to the preprocessing means for carrying out a logical operation on the preprocessed signal to produce the sum signal.

BRIEF DESCRIPTION OF THE DRAWING:

FIG. 2 shows an example of input data signals for use in describing principles of a logic operation which is carried out by a logic circuit in a summing circuit according to a first aspect of this invention;

FIG. 3 shows a first stage of the principles of the logic operation mentioned in conjunction with FIG. 2;

FIG. 4 shows a second stage of the above-mentioned principles of the logic operation;

FIG. 6 is a diagram for use in describing a practical operation of the summing circuit described with reference to FIGS. 1 through 5;

FIG. 7 is another diagram for use in describing the practical operation mentioned in connection with FIG. 6;

FIG. 10 shows a second stage of the above-mentioned principles of the logic operation;

FIG. 11 shows a third stage of the principles of the logic operation under consideration;

FIG. 12 shows a fourth stage of the principles of the logic operation in question;

FIG. 13 shows a final stage of the principles of the logic operation under consideration;

FIG. 15 is a diagram for use in describing another practical operation of the summing circuit described with reference to FIG. 1 and FIGS. 8 through 14; and FIG. 16 is another diagram for use in describing the practical operation mentioned in connection with FIG. 15.

Figure 1:
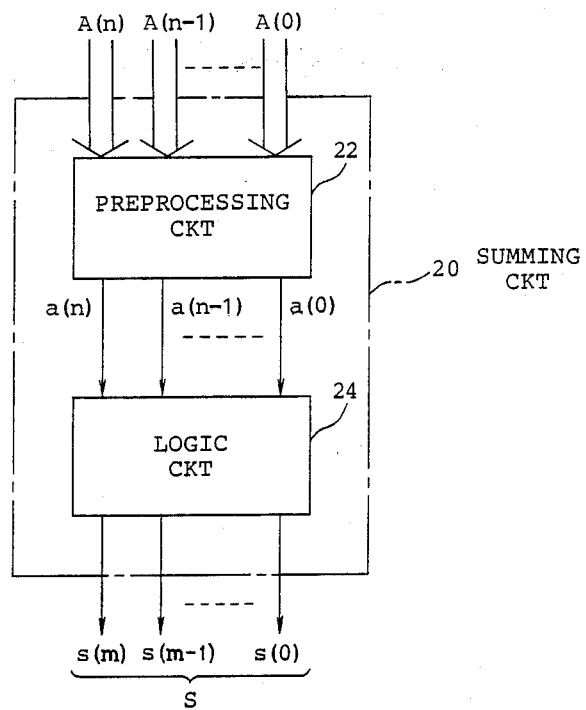
FIG. 1 is a block diagram of a summing circuit according to the present invention.

DESCRIPTION OF THE PREFERRED EMBODIMENTS:

Referring to FIG. 1, description will begin with a summing circuit 20 according to the present invention in general. The summing circuit 20 is supplied with zeroth through n-th input data signals A(0) to A(n) representative of zeroth through n-th summands, respectively, where n represents a first predetermined natural number and where each input data signal is given by $(n+k+1)$ binary input data signal bits where, in turn, it should be understood that m represents a second predetermined natural number which is not less than the first predetermined natural number n and that k represents a predetermined integer which is not negative. In each input data signal, the binary input data signal bits are arranged from a most significant bit $2^{m+k}$ down to a least significant bit $2^0$.

The summing circuit 20 is used for summing up the first through the n-th summands into a grand total and for producing a sum signal S representative of a predetermined part of the grand total. The sum signal S consists of (m +1) binary sum bits which are arranged in correspondence to the most significant bit of each of the input data signals A(0) to A(n) through a k-th bit $2^k$ as counted from the least significant bit of each input data signal. When viewed from a least significant bit to a most significant bit, it is possible to understand that the sum signal S is represented by zeroth through m-th binary output bits which are representative of a k-th binary digit or a ($2^k$)'s place of the grand total through an (m +k)-th binary digit or a ($2^{m+k}$)'s place.

The summing circuit 20 comprises a preprocessing circuit 22 and a logic circuit 24. The preprocessing circuit 22 is for preprocessing the zeroth through the n-th input data signals A(0) to A(n) into a preprocessed signal which is (n +1) bits arranged from a most significant bit $2^n$ to a least significant bit $2^0$. The least through the most significant bits $2^0$ to $2^n$ of the preprocessed signal are equal to the most significant bits $2^{m+k}$ of the zeroth through n-th input data signals A(o) to A(n), respectively. The logic circuit 24 is coupled to the preprocessing circuit 22 and is for carrying out a logical operation on the preprocessed signal to produce the sum signal S.

In detail, the summing circuit 20 is implemented in accordance with a first and a second aspect of this invention. At first, the first aspect will be described. The second aspect will be described later in the following.

For a summing circuit 20 according to the first aspect, each of the zeroth through the n-th input data signals A(0) to A(n) is given by an equation:

$$A(d) = a(d) \times \sum_{i=d}^{n} 2^{i+K} + A \times \sum_{i=0}^{K+d-1} 2^i, \quad (1)$$

where d represents a first integer which is consecutively varying from zero to the first predetermined natural number n and where the predetermined integer k is equal to zero. The equation has a first and a second term in the right-hand side. The second term has a meaning which will presently be described when (d−1) becomes negative. In the equation, A(d) represents a d-th input data signal among the zeroth through the n-th input data signals, a(d) represents a d-th coefficient having one of logic or binary zero and one values, and A represents a common coefficient which has a logic zero value. When (d−1) is negative, the second term represents the logic zero value. In this event, the preprocessing circuit 22 produces the zeroth through the n-th coefficients a(0) to a(n) as zeroth through n-th processed bits of the preprocessed signal.

FIG. 2 shows an example of the zeroth through the n-th input data signals A(0) to A(n). For the example being illustrated, the first predetermined natural number n is equal to seven. The second predetermined natural number m is equal to the first predetermined natural number n. The predetermined integer k is equal to zero. This example will be used in describing the principles of a logic operation carried out by the logic circuit 24.

FIG. 3 shows a first stage of the principles of logic operation. In the first stage, attention is directed to a first partial sum of the zeroth and the first input data signals A(0) and A(1) depicted above an arrow. As depicted below the arrow, the first partial sum consists of zeroth through seventh sum bits s'(0) to s'(7) of the first stage. The zeroth sum bit s'(0) is the least significant bit of a first partial sum signal representative of the first partial sum. The seventh sum bit s'(7) is the most significant bit. The least significant bit through the most significant bit of each input data signal A(d) will be called zeroth through seventh digits.

The zeroth digits of the zeroth and the first input data signals A(0) and A(1) will be taken into consideration. The zeroth sum bit s'(0) of the first results from first sum of these zeroth digits. is equal to the zeroth digit of the zeroth input data signal A(0). In other words:

$$s'(0) = a(0).$$

No carry results on calculating the first sum of the first stage. It is therefore possible to say that a first carry signal c'(1) of the first stage represents the logic zero value.

With the first carry signal c'(1) of the first stage borne in mind, the first digits of the zeroth and the first input data signals A(0) and A(1) will be taken into consideration. The first sum bit s'(1) of the first stage is equal to an exclusive OR of the first digits of the zeroth and the first input data signals A(0) and A(1). In other words, the first sum bit s'(1) is given by a Boolean expression:

$$s'(1) = a(1) \oplus a(0),$$

where the symbol $\oplus$ is used as an exclusive-OR operator. In addition to the first sum bit s'(1), a carry may or may not result. That is, a second carry signal c'(2) of the first stage is given by another Boolean expression:

$$c'(2) = a(1) \times a(0),$$

where the symbol x represents an AND operator.

The second digits of the zeroth and the first input data signals A(0) and A(1) will be taken into consideration. The second sum bit s'(2) of the first stage is given by still another Boolean expression:

$$\begin{aligned}s'(2) &= a(1) \oplus a(0) \oplus c'(2) \\ &= a(1) \oplus a(0) \oplus (a(1) \times a(0)).\end{aligned}$$

That is, the last-mentioned Boolean expression is identical with an equivalent Boolean expression:

$$s'(2) = a(1) + a(0),$$

where the symbol + represents an OR operator. In addition to the second sum bit s'(2), a third carry signal c'(3) of the first stage is produced according to:

$$c'(3) = a(1) \times a(0).$$

In this manner, the third through the seventh sum bits s'(3) to s'(7) of the first stage are given by:

$$\begin{aligned}s'(3) &= s'(4) = \ldots = s'(7) \\ &= a(1) + a(0).\end{aligned}$$

Upon carrying out addition of the most significant digits of the zeroth and the first input data signals A(0) and A(1), a carry may or may not result. It will be noted that this carry is neglected. The reason therefor will become clear when the description proceeds to a practical example of the summing circuit according to the first aspect.

FIG. 4 shows a second stage of the principles of logic operation. In the second stage, attention is directed to the zeroth through the seventh sum bits s'(0) to s'(7) of the first stage and the zeroth through the seventh digits of the second input data signal A(2). A second partial sum of the zeroth through the second input data signals A(0) to A(2) is represented by zeroth through seventh sum bits s''(0) to s''(7) of the second stage.

The zeroth and the first sum bits s'(0) and s'(1) of the first stage and the zeroth and the first digits of the second input data signal A(2) will be taken into consideration. In the manner described above in connection with the zeroth sum bit s'(0), the zeroth and the first sum bits s''(0) and s''(1) of the second stage are equal to the zeroth and the first sum bits s'(0) and s'(1) of the first stage. In other words:

$$s''(0) = s'(0) = a(0),$$

and $$s''(1) = s'(1) = a(1) \oplus a(0).$$

First and second carry signals c''(1) and c''(2) have the logic zero value.

The second sum bit s'(2) of the first stage and the second digit of the second input data signal A(2) will be taken into consideration. The second sum bit s''(2) of the second stage is given by:

$$\begin{aligned} s''(2) &= a(2) \oplus s'(2) \\ &= a(2) \oplus (a(1) + a(0)). \end{aligned}$$

In addition to the second sum bit s''(2), a third carry signal c''(3) of the second stage is produced in compliance with:

$$c''(3) = a(2) \times (a(1) + a(0)).$$

The third digit of the second input data signal A(2) will be taken into consideration. The third sum bit s''(3) of the second stage is given by:

$$\begin{aligned} s''(3) &= a(2) \oplus s'(3) \oplus c''(3) \\ &= a(2) \oplus s'(3) \oplus (a(2) \times (a(1) + a(0))) \\ &= a(2) \ \oplus \ (a(1) + a(0)) \\ &\qquad \oplus \ (a(2) \times (a(1) + a(0))) \\ &= a(2) \times (a(1) + a(0)) + a(2) \\ &= a(2) + a(1) + a(0). \end{aligned}$$

In addition to the third sum bit s''(3), a fourth carry signal c''(4) of the second stage is produced in accordance with:

$$c''(4) = a(2) \times (a(1) + a(0)).$$

In this manner, the fourth through the seventh sum bits s''(4) to s''(7) of the second stage are given by:

$$\begin{aligned} s''(4) &= s''(5) = s''(6) = s''(7) \\ &= a(2) + a(1) + a(0). \end{aligned}$$

Upon carrying out addition of the most significant digit of the second input data signal A(2) and the most significant bit of a partial sum signal representative of a sum of the zeroth and the first input data signals A(0) and A(2), a carry may or may not result. This carry is neglected.

Turning back to FIG. 1, it will now be understood from the foregoing that the sum signal S is produced by the logic circuit 24 with zeroth through seventh output or sum bits s(0) to s(7) when the preprocessing circuit 22 is supplied with the input data signals A(0) through A(7) exemplified in FIG. 2. The output bits s(0) to s(7) are given by zeroth through seventh Boolean expressions:

$$s(0) = a(0),$$

$$s(1) = a(1) \oplus a(0),$$

$$s(2) = a(2) \oplus (a(1) + a(0)),$$

..., and $$s(7) = a(7) \oplus (a(6) + a(5) + \ldots + a(1) + a(0)).$$

In addition to the seventh output bit s(7), an eventual carry signal may or may not be produced. The eventual carry signal is again neglected.

Figure 5:
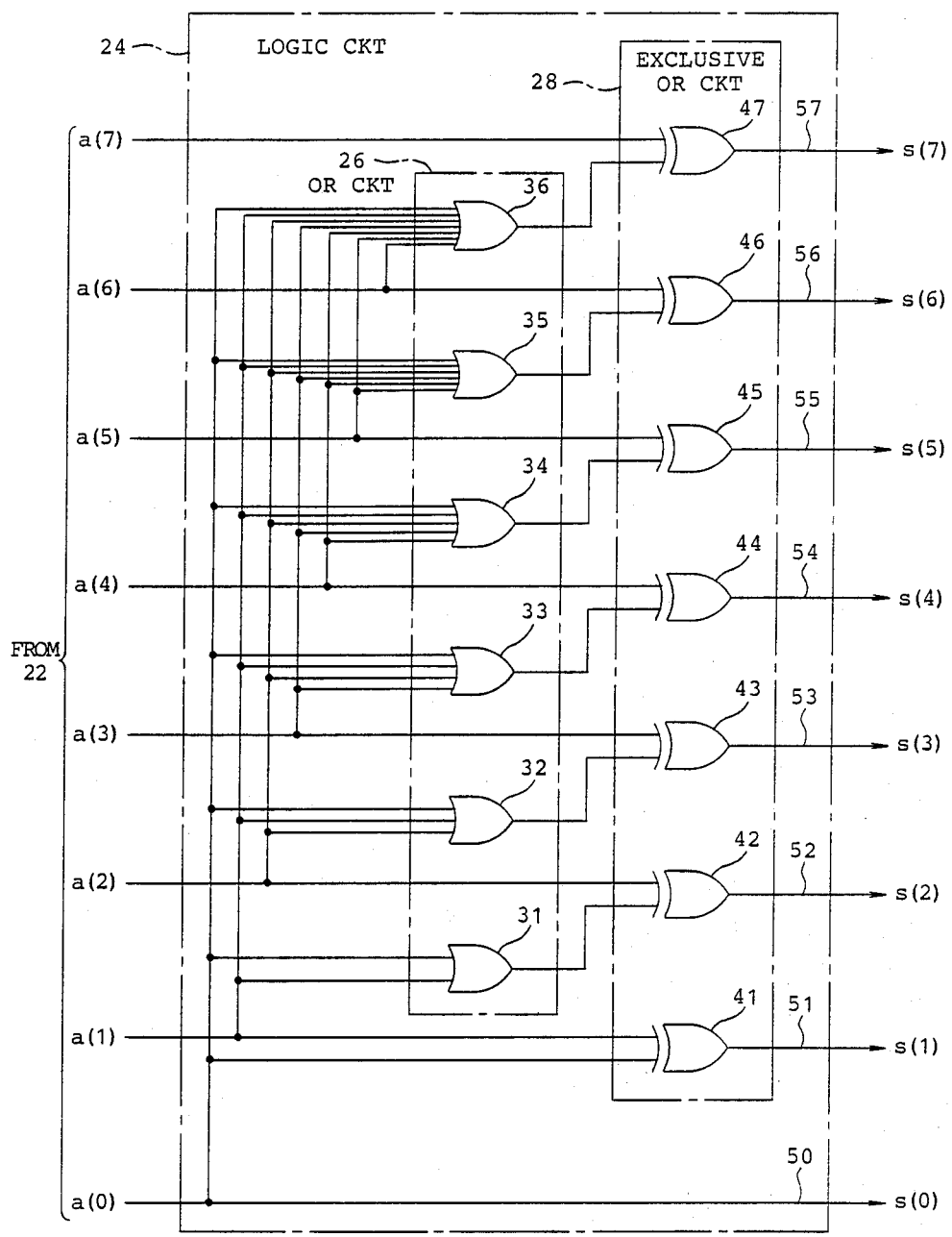
FIG. 5 is a block diagram of a logic circuit for use in a summing circuit according to a first embodiment of this invention.

Referring now to FIG. 5, the logic circuit 24 is for use in a summing circuit 20 according to a first embodiment of this invention. Generally speaking, the logic circuit 24 is for calculating Boolean expressions of the above-described type and comprises an OR circuit 26 coupled to the preprocessing circuit 22 and an Exclusive OR circuit 28 coupled to the preprocessing circuit 22 and the OR circuit 26.

Merely for simplicity of the description, it will be presumed that the summing circuit 20 is for the zeroth through the seventh input data signals A(0) to A(7) exemplified in FIG. 2. The logic circuit 24 is supplied from the preprocessor circuit 22 with the zeroth through the seventh coefficients a(0) to a(7) as the zeroth through the seventh processed bits of the preprocessed signal.

The OR circuit 26 is for carrying out an OR operation on only the zeroth through the sixth processed bits, namely, on only seven bits of the preprocessed signal with the seventh or the most significant bit excluded. The OR circuit 26 thereby produces an OR'ed output signal which is six bits long. The respective bits of the OR'ed output signal will be named first through sixth OR'ed bits.

The Exclusive OR circuit 28 is for carrying out an exclusive-OR operation on a combination of the zeroth through the seventh processed bits of the preprocessed signal and the six or the entire bits of the OR'ed output signal. The Exclusive OR circuit 28 thereby produces an exclusive-OR'ed output signal which is seven bits long. The seven bits of the exclusive-OR'ed output signal will be referred to as first through seventh exclusive-OR'ed bits.

More particularly, the OR circuit 26 comprises first through sixth OR gates 31, 32, 33, 34, 35, and 36. Supplied with the zeroth and the first processed bits, namely, with the zeroth and the first coefficients a(0) and a(1), the first OR gate 31 calculates an OR of the zeroth and the first coefficients to produce the first OR'ed bit given by the first Boolean expression described before in conjunction with FIG. 1. Similarly, the second OR circuit 32 calculates an OR of the zeroth through the second processed bits to produce the second OR'ed bit given by a Boolean expression (a(2) +a(1) +a(0)) which is used in the second Boolean expression. In this manner, the third through the sixth OR circuits 33 to 37 produce the third through the sixth OR'ed bits. For example, the sixth OR'ed bit is given by a Boolean expression used as the second term in the seventh Boolean expression described before.

The Exclusive OR circuit 28 comprises first through seventh Exclusive OR gates 41, 42, 43, 44, 45, 46, and 47. Supplied with the zeroth and the first coefficients a(0) and a(1) directly from the preprocessing circuit 22 as the zeroth and the first processed bits, the first Exclusive OR gate 41 produces the first exclusive-OR'ed bit given by a Boolean expression described before in connection with FIG. 1 in the right-hand side of the first Boolean expression. Responsive to the second processed bit and the first OR'ed bit, the second Exclusive OR gate 42 produces the second exclusive-OR'ed bit given in the second Boolean expression. In a like manner, the third through the seventh Exclusive OR gates 43 to 47 produce the third through the seventh exclusive-OR'ed bits in accordance with the third through the seventh Boolean expressions.

The logic circuit 24 produces the zeroth output bit s(0) through a zeroth signal line 50. The zeroth output bit s(0) is given by the zeroth coefficient a(0) which is delivered directly from the preprocessing circuit 22 as the zeroth processed bit. Through first through seventh signal lines 51, 52, 53, 54, 55, 56, and 57, the first through the seventh exclusive-OR'ed bits are produced as the first through the seventh output bits s(1) to s(7). The zeroth through the seventh signal lines 50 to 57 collectively serve as a producing arrangement coupled to the preprocessing circuit 22 and the Exclusive OR circuit 28 for producing a combination of the least significant bit alone of the preprocessed signal and the exclusive-OR'ed output signal as the sum signal S.

Reviewing FIGS. 1 to 5, it will be understood that the summing circuit 20 is applicable to addition of the input data signals A(0) through A(n). In this event, the output bits s(0) to s(n) are generally given by zeroth through n-th Boolean expression:

$s(0) = a(0),$ $s(0) = a(1) + a(0),$ $s(0) = a(2) \oplus (a(1) + a(0)),$

..., and $s(n) = a(n) \oplus (a(n-1) 30\, a(n-2) + \ldots + a(1) + a(0)).$

Turning to FIGS. 6 and 7, the description will proceed to a practical operation of the summing circuit 20 thus far described with reference to FIGS. 1 through 5. It will be assumed as follows. The first predetermined natural number n is equal to nine. The second predetermined natural number m is equal to the first predetermined natural number n. The predetermined integer k is equal to six. The summing circuit 20 is used on calculating a product of a first and a second integer which are equal to decimal (−37) and decimal (−74).

Upon calculating the product, the first and second integers are converted to first and second binary numbers in the known manner. Each of the first and the second binary number is represented by eight digits. More particularly, the first binary number is represented by binary 1101 1011. The second binary number is given by binary 1011 0110. Each binary number has a most significant bit which serves as a sign bit. Each binary number may be represented by sixteen digits. More particularly, the first binary number may be represented by a third binary number 1111 1111 1101 1011. The second binary number may be given by a fourth binary number 1111 1111 1011 0110. In this event, each of the third and the fourth binary numbers has eighth through fifteenth digits each of which has a value equal to that of the sign bit. When represented by such binary numbers, the third binary number will be called a multiplicand and the fourth binary number, a multiplier.

In this example, the predetermined integer k is equal to six. This is because the same logic level is shared in common in the multiplicand by the bit next following the sign bit on a less significant side and the sign bit which may be called a true sign bit. The next following bit may be considered as a provisional sign bit similar to the true sign bit. Inasmuch as the most significant bit of the product is generally a digit of $2^{m+k}$ and of $2^{15}$ in the example being illustrated, the second predetermined natural number m is equal to fifteen minus six, namely, nine. As mentioned in conjunction with FIG. 2, the first predetermined natural number n is equal to the second predetermined natural number m and is therefore nine.

In the manner known in the art, the product is calculated by successively multiplying the multiplicand by each individual digit of the multiplier. Such multiplication by the sixteen digits of the multiplier results in sixteen partial products depicted in FIG. 6.

In the example being illustrated, the partial products are zeroth through fifteenth partial products. The zeroth partial product is given by multiplying the multiplicand and the least significant bit of the multiplier. In general, an e-th partial product is given by multiplying the multiplicand and an e-th bit as counted from the least significant bit of the multiplier.

In FIG. 6, a part of the partial products is surrounded by a solid line as a surrounded part which is represented by the first term on the right-hand side of Equation (1) when the first predetermined natural number n, the second predetermined natural number m, and the predetermined integer k are equal to nine, nine, and six, respectively, as mentioned above. The partial products enclosed with the solid line will be called main partial products. Those outwardly of the main partial products will be referred to as modified partial products. More specifically, the zeroth through ninth input data signals A(0) to A(9) are given by:

A(0) = 0000 0000 0000 0000,
A(1) = 1111 1111 1000 0000,
A(2) = 1111 1111 0000 0000,
A(3) = 0000 0000 0000 0000,
A(4) = 1111 1100 0000 0000,
A(5) = 1111 1000 0000 0000,
A(6) = 0000 0000 0000 0000,
A(7) = 1110 0000 0000 0000,
A(8) = 1100 0000 0000 0000,
and A(9) = 1000 0000 0000 0000.

Accordingly, the zeroth through the ninth coefficients are given by:
a(0) = 0,
a(1) = 1,
a(2) = 1,
a(3) = 0,
a(4) = 1,
a(5) = 1, a(6)=0,
a(7)=1,
a(8)=1,
and a(9)=1.

By the use of the summing circuit 20, zeroth through ninth output bits s(0) to s(9) of the sum signal S are given by:
s(0)=0,
s(1)=1,
s(2)=0,
s(3)=1,
s(4)=0,
s(5)=0,
s(6)=1,
s(7)=0,
s(8)=0,
and s(9)=0.

Accordingly, it is easily possible to calculate the sum signal S which composes part of the product and is surrounded by another solid line in FIG. 7. In addition, it is possible to separate the modified partial products from the partial products. As a result, the product is calculated in the known manner by a total sum of the sum signal S and the modified partial products. In the example being illustrated, the product of the third and the fourth binary numbers is equal to binary 0000 1010 1011 0010 which is equal to decimal 2738.

For a summing circuit 20 according to the second aspect, each of the zeroth through the n-th input data signals A(0) to A(n) is given by another equation:

$$A(d) = a(d) \times \sum_{i=p(d)}^{m} 2^{i+K} + A \times \sum_{i=0}^{K+p(d)-1} 2^i, \qquad (2)$$

where k is equal to zero and where p(d)'s represent zeroth through n-th discrete integers which are discontinuously preselected so that the zeroth discrete integer is equal to zero, the first discrete integer p(1) is not less than two, the n-th discrete integer p(n) is not greater than the second predetermined natural number less one, namely, (m−1), and the second through the (n−1)-th discrete integers successively increase, each of the second through the (n−1)-th discrete integers being different from each of the (d−1)-th and the (d+1)-th discrete integers by at least two.

Figures 8, 9:
FIG. 8 shows another example of input data signals for use in describing principles of a logic operation which is carried out by a logic circuit in a summing circuit according to a second aspect of this invention.
FIG. 9 shows a first stage of the principles of the logic operation mentioned in conjunction with FIG. 8.

FIG. 8 shows another example of the zeroth through n-th input data signals A(0) to A(n). For the example being illustrated, the first predetermined natural number n is equal to five. The second predetermined natural number m is equal to fifteen. The predetermined integer k is equal to zero. The zeroth through the fifth discrete integers p(0), p(1), p(2), p(3), p(4), and p(5) are equal to zero, two, five, nine, twelve, and fourteen, respectively. This example will be used in describing the principles of another logic operation carried out by the logic circuit 24.

FIG. 9 shows a first stage of the principles of logic operation. In the first stage, attention is directed to a first partial sum of the zeroth and the first input data signals A(0) and A(1) depicted above an arrow. The first partial sum will be denoted by T. As depicted below the arrow, the first partial sum T consists of zeroth through fifteenth sum bits t(0) to t(15) of the first stage. The zeroth sum bit t(0) is the least significant bit of a first partial sum signal representative of the first partial sum T. The fifteenth sum bit t(15) is the most significant bit. The least significant bit through the most significant bit of each input data signal A(d) will be called zeroth through fifteenth digits.

The zeroth and the first digits of the zeroth and the first data signals A(0) and A(1) will be taken into consideration. The zeroth and the first sum bits t(0) and t(1) of the first stage result from a first and a second sum of these zeroth and first digits. Inasmuch as the zeroth and the first digits of the first input data signal A(1) are equal to zero, the zeroth and the first sum bits t(0) and t(1) are equal to the zeroth and the first digits of the zeroth input data signal A(0), respectively. In other words, $$t(0)=a(0),$$

and $t(1)=a(0)$.

No carry results on calculating the first and the second sum of the first stage. It is therefore possible to say that a first and a second carry signal ct(1) and ct(2) of the first stage represent the logic zero value.

With the first and the second carry signal ct(1) and ct(2) of the first stage borne in mind, the second digits of zeroth and the first input data signals A(0) and A(1) will be taken into consideration. The second sum bit t(2) of the first stage is equal to an exclusive OR of the second digits of the zeroth and the first input data signals A(0) and A(1). In other words, the second sum bit t(2) is given by a Boolean expression:

$$t(2)=a(1) \oplus a(0).$$

In addition to the second sum bit t(2), a carry may or may not result. That is, a third carry signal ct(3) of the first stage is given by another Boolean expression:

$$ct(3)=a(1) \times a(0).$$

The third digits of the zeroth and the first input data signals A(0) and A(1) will be taken into consideration. The third sum bit t(3) of the first stage is given by still another Boolean expression:

$$\begin{aligned} t(3) &= a(1) \oplus a(0) \oplus ct(3) \\ &= a(1) \oplus a(0) \oplus (a(1) \times a(0)). \end{aligned}$$

That is, the last-mentioned Boolean expression is identical with an equivalent Boolean expression:

$$t(3)=a(1)+a(0).$$

In addition to the third sum bit t(3), a fourth carry signal ct(4) of the first stage is produced according to:

$$ct(4)=a(1) \times a(0).$$

In this manner, the fourth through the fifteenth sum bits t(4) to t(15) of the first stage are given by:

$$\begin{aligned} t(4) &= t(5) = \ldots = t(15) \\ &= a(1) + a(0). \end{aligned}$$

On carrying out addition of the most significant digits of the zeroth and the first data signals A(0) and A(1), a carry may or may not result. It should be noted that this carry is neglected. The reason therefor will become clear when the description proceeds to a practical example of the summing circuit according to the second aspect.

FIG. 10 shows a second stage of the principles of logic operation. In the second stage, attention is directed to the zeroth through the fifteenth sum bits t(0) to t(15) of the first stage and the zeroth through the fifteenth digits of the second input data signal A(2). A second partial sum of the zeroth through the second input data signals A(0) to A(2) will be denoted by U. The second partial sum U is represented by zeroth through fifteenth sum bits u(0) to u(15) of the second stage.

The zeroth through the fourth sum bits t(0) to t(4) of the first stage and the zeroth through the fourth digits of the second data signal A(2) will be taken into consideration. In the manner described above in connection with the zeroth and the first sum bits t(0) and t(1), the zeroth through the fourth sum bits u(0) to u(4) of the second stage are equal to the zeroth through the fourth sum bits t(0) to t(4) of the first stage. In other words, $$u(0)=t(0)=a(0),$$

$$u(1)=t(1)=a(0),$$

$$u(2)=t(2)=a(1)\oplus a(0),$$

$$u(3)=t(3)=a(1)+a(0),$$

$$\text{and } u(4)=t(4)=a(1)=a(0).$$

First through fifth carry signals cu(1) to cu(5) have the logic zero value.

The fifth sum bit t(5) of the first stage and the fifth digit of the second data signal A(2) will be taken into consideration. The fifth sum bit u(5) of the second stage is given by:

$$\begin{aligned} u(5) &= a(2) \oplus t(5) \\ &= a(2) \oplus (a(1) + a(0)). \end{aligned}$$

In addition to the fifth sum bit u(t), a sixth carry signal cu(6) of the second stage is produced in compliance with:

$$\begin{aligned} cu(6) &= a(2) \times t(5) \\ &= a(2) \times (a(1) + a(0)). \end{aligned}$$

The sixth digit of the second input data signal A(2) will be taken into consideration. The sixth sum bit u(6) of the second stage is given by:

$$\begin{aligned} u(6) &= a(2) \oplus t(6) \oplus cu(6) \\ &= a(2) \oplus t(5) \oplus (a(2) \times t(5)) \\ &= a(2) + t(5) \\ &= a(2) + a(1) + a(0). \end{aligned}$$

In addition to the sixth sum bit u(6), a seventh carry signal cu(7) of the second stage is produced in accordance with:

$$cu(7)=a(2)\times(a(1)+a(0)).$$

In this manner, the seventh through the fifteenth sum bits u(7) to u(15) of the second stage are given by:

$$\begin{aligned} u(7) &= u(8) = u(9) = \ldots = u(15) \\ &= a(2) + a(1) + a(0). \end{aligned}$$

Upon carrying out addition of the most significant digit of the second input data signal A(2) and the most significant bit of the first partial sum signal representative of a sum of the zeroth and the first input signals A(0) and A(1), a carry may or may not result. This carry is neglected.

FIG. 11 shows a third stage of the principles of the logic operation. In the third stage, attention is directed to the zeroth through the fifteenth sum bits u(0) to u(15) of the second stage and the zeroth through the fifteenth digits of the third input data signal A(3). A third partial sum of the zeroth through the third input data signals A(0) to A(3) will be denoted by V. The third partial sum V is represented by zeroth through fifteenth sum bits v(0) to v(15) of the third stage.

In the manner described above in connection with the zeroth through the fifteenth sum bits u(0) to u(15) of the second stage, the zeroth through the fifteenth sum bits v(0) to v(15) of the third stage are given by:

$$v(0)=u(0)=a(0),$$

$$v(1)=u(1)=a(0),$$

$$v(2)=u(2)=a(1)\oplus a(0),$$

$$v(3)=u(3)=a(1)+a(0),$$

$$v(4)=u(4)=a(1)+a(0),$$

$$v(5)=u(5)=a(2)\oplus(a(1)+a(0)),$$

$$v(6)=u(6)=a(2)+a(1)+a(0),$$

$$v(7)=u(7)=a(2)+a(1)+a(0),$$

$$v(8)=u(8)=a(2)+a(1)+a(0),$$

$$\begin{aligned} v(9) &= a(3) \oplus u(9) \\ &= a(3) \oplus (a(2) + a(1) + a(0)), \\ \text{and } v(10) &= v(11) = v(12) = \ldots = v(15) \\ &= a(3) + u(9) \\ &= a(3) + a(2) + a(1) + a(0). \end{aligned}$$

FIG. 12 shows a fourth stage of the principles of the logic operation. In the fourth stage, attention is directed to the zeroth through the fifteenth sum bits v(0) to v(15) of the third stage and the zeroth through the fifteenth digits of the fourth input data signal A(4). A fourth partial sum of the zeroth through the fourth input data signal A(0) to A(4) will be denoted by W. The fourth partial sum W is represented by zeroth through fifteenth sum bits w(0) to w(15) of the fourth In the manner described above in connection with the zeroth through the fifteenth sum bits v(0) to v(15) of the third stage, the zeroth through the fifteenth sum bits w(0) to w(15) of the fourth stage are given by:

$$w(0) = v(0) = a(0),$$
$$w(1) = v(1) = a(0),$$
$$w(2) = v(2) = a(1) \oplus a(0),$$
$$w(3) = v(3) = a(1) + a(0),$$
$$w(4) = v(4) = a(1) + a(0),$$
$$w(5) = v(5) = a(2) \oplus (a(1) + a(0)),$$
$$w(6) = v(6) = a(2) + a(1) + a(0),$$
$$w(7) = v(7) = a(2) + a(1) + a(0),$$
$$w(8) = v(8) = a(2) + a(1) + a(0),$$
$$w(9) = v(9)$$
$$= a(3) \oplus (a(2) + a(1) + a(0)),$$
$$w(10) = v(10)$$
$$= a(3) + a(2) + a(1) + a(0),$$
$$w(11) = v(11)$$
$$= a(3) + a(2) + a(1) + a(0),$$
$$w(12) = a(4) \oplus v(12)$$
$$= a(4) \oplus (a(3) + a(2) + a(1) + a(0)),$$
$$\text{and } w(13) = w(14) = w(15)$$
$$= a(4) + v(12)$$
$$= a(4) + a(3) + a(2) + a(1) + a(0).$$

FIG. 13 shows a fifth stage, namely, a final stage of the principles of the logic operation. In the final stage, attention is directed to the zeroth through the fifteenth sum bits w(0) to w(15) of the fourth stage and the zeroth through the fifteenth digits of the fifth input data signal A(5). A final partial sum of the zeroth through the fifth input data signal A(0) to A(5) will be denoted by S. The final partial sum S is equivalent to the sum signal. The sum signal S is represented by zeroth through fifteenth sum bits s(0) to s(15) of the final stage.

In the manner described above in connection with the zeroth through the fifteenth sum bits w(0) to w(15) of the fourth stage, the zeroth through the fifteenth sum bits s(0) to s(15) of the final stage are given by:

$$s(0) = w(0) = a(0),$$
$$s(1) = w(1) = a(0),$$
$$s(2) = w(2) = a(1) \oplus a(0),$$
$$s(3) = w(3) = a(1) + a(0),$$
$$s(4) = w(4) = a(1) + a(0),$$
$$s(5) = w(5) = a(2) \oplus (a(1) + a(0)),$$
$$s(6) = w(6) = a(2) + a(1) + a(0),$$
$$s(7) = w(7) = a(2) + a(1) + a(0),$$
$$s(8) = w(8) = a(2) + a(1) + a(0),$$
$$s(9) = w(9)$$
$$= a(3) \oplus (a(2) + a(1) + a(0)),$$
$$s(10) = w(10)$$
$$= a(3) + a(2) + a(1) + a(0),$$
$$s(11) = w(11)$$
$$= a(3) + a(2) + a(1) + a(0),$$
$$s(12) = w(12)$$
$$= a(4) \oplus (a(3) + a(2) + a(1) + a(0))$$
$$s(13) = w(13)$$
$$= a(4) + a(3) + a(2) + a(1) + a(0),$$
$$s(14) = a(5) \oplus w(14)$$
$$= a(5) \oplus (a(4) + a(3) + a(2) + a(1) + a(0),$$
$$\text{and } s(15) = a(5) + w(14)$$
$$= a(5) + a(4) + a(3) + a(2) + a(1) + a(0).$$

Turning back to FIG. 1, it will now be understood from the foregoing that the sum signal S is produced by the logic circuit 24 with zeroth through fifteenth output or sum bits s(0) to s(15) when the preprocessing circuit 22 is supplied with the input data signals A(0) through A(5) exemplified in FIG. 8. The output bits s(0) to s(15) are given by zeroth through fifteenth Boolean expression:

$$s(0) = a(0),$$
$$s(1) = a(0),$$
$$s(2) = a(1) \oplus a(0),$$
$$s(3) = a(1) + a(0),$$
$$s(4) = a(1) + a(0),$$
$$s(5) = a(2) \oplus (a(1) + a(0)),$$
$$s(6) = a(2) + a(1) + a(0),$$
$$s(7) = a(2) + a(1) + a(0),$$
$$s(8) = a(2) + a(1) + a(0),$$
$$s(9) = a(3) \oplus (a(2) + a(1) + a(0)),$$
$$s(10) = a(3) + a(2) + a(1) + a(0),$$
$$s(11) = a(3) + a(2) + a(1) + a(0),$$
$$s(12) = a(4) \oplus (a(3) + a(2) + a(1) + a(0)),$$
$$s(13) = a(4) + a(3) + a(2) + a(1) + a(0),$$
$$s(14) = a(5) \oplus (a(4) + a(3) + a(2) + a(1) + a(0)),$$
$$\text{and } s(15) = a(5) + a(4) + a(3) + a(2) + a(1) + a(0).$$

In addition to the fifteenth output bit s(15), an eventual carry signal may or may not be produced. The eventual carry signal is again neglected.

Figure 14:
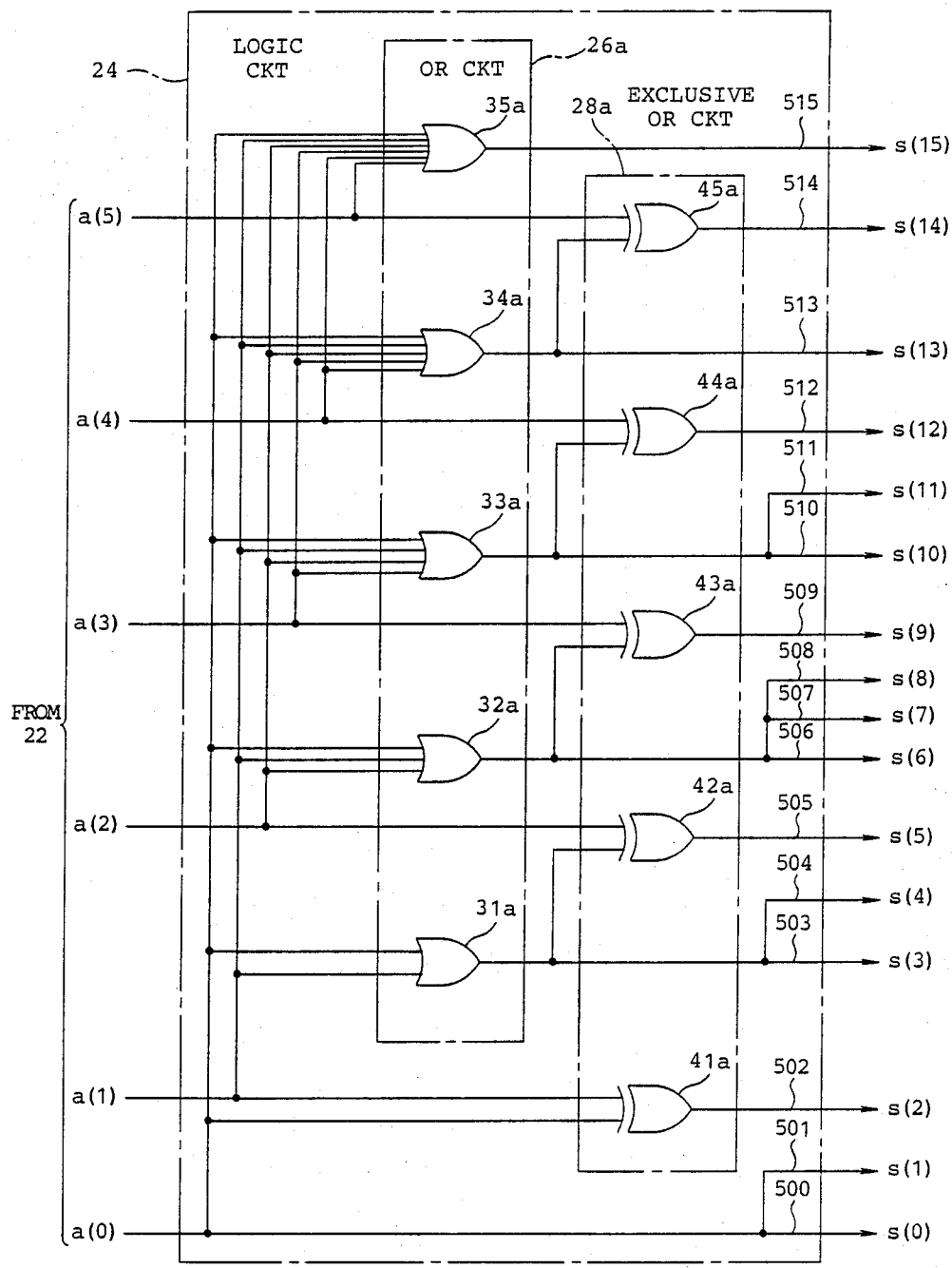
FIG. 14 is a block diagram of another logic circuit for use in a summing circuit according to a second embodiment of this invention.

Referring now to FIG. 14, the logic circuit 24 is for use in a summing circuit 20 according to a second embodiment of this invention. Generally speaking, the logic circuit 24 is for calculating Boolean expressions of the above-described type and comprises an OR circuit 26a coupled to the preprocessing circuit 22 and an exclusive OR circuit 28a coupled to the preprocessing circuit 22 and the OR circuit 26a.

Merely for simplicity of the description, it will be presumed that the summing circuit 20 is for the zeroth through the fifth input data signals A(0) to A(5) exemplified in FIG. 8. The logic circuit 24 is supplied from the preprocessed circuit 22 with the zeroth through the fifth coefficients a(0) to a(5) as the zeroth through the fifth processed bits of the preprocessed signal.

The OR circuit 26a is for carrying out an OR operation on the zeroth through the fifth processed bits. The OR circuit 26a thereby produces an OR'ed output signal which is five bits long. The respective bits of the OR'ed output signal will be named first through fifth OR'ed bits.

The exclusive OR circuit 28a is for carrying out an exclusive-OR operation on a combination of the zeroth through the fifth processed bits of the preprocessed signal and only the first through the fourth OR'ed bits, namely, only four bits of the OR'ed output signal with the fifth or the most significant bit excluded. The exclusive OR circuit 28a thereby produces an exclusive-OR'ed output signal which is five bits long. The five bits of the exclusive-OR'ed output signal will be referred to as first through fifth exclusive-OR'ed bits.

More particularly, the OR circuit 26a comprises first through fifth OR gates 31a, 32a, 33a, 34a, and 35a. Supplied with the zeroth and the first processed bits, namely, with the zeroth and the first coefficients a(0) and a(1), the first OR gates 31a calculates an OR of the zeroth and the first coefficients to produce the first OR'ed bit given by the third and the fourth Boolean expression described before in conjunction with FIG. 1. Similarly, the second OR circuit 32a calculates an OR of the zeroth through the second processed bits to produce the second OR'ed bit given by the sixth through the eighth Boolean expression. In this manner, the third through the fifth OR circuit 33a to 35a produce the third through the fifth OR'ed bits. For example, the fifth OR'ed bit is given by the fifteenth Boolean expression described before.

The exclusive OR circuit 28a comprises first through fifth exclusive OR gates 41a, 42a, 43a, 44a, and 45a. Supplied with the zeroth and the first coefficients a(0) and a(1) directly from the preprocessing circuit 22 as the zeroth and the first processed bits, the first exclusive OR gates 41a produces the first exclusive OR'ed bit given by a Boolean expression described before in connection with FIG. 1 in the right-hand side of the second Boolean expression. Responsive to the second processed bit and the first OR'ed bit, the second exclusive OR gates 42a produces the second exclusive OR'ed bit given by the fifth Boolean expression. In a like manner, the third through the fifth exclusive OR gates 43a to 45a produce the third through the fifth exclusive-OR'ed bit in accordance with the ninth, the twelfth, and the fourteenth Boolean expressions, respectively.

The logic circuit 24 produces the zeroth and the first output bits s(0) and s(1) through zeroth and first signal lines 500 and 501, respectively. The zeroth and the first bits s(0) and s(1) are given by the zeroth coefficient a(0) which is delivered directly from the preprocessing circuit 22 as the zeroth processed bit. Through second, fifth, ninth, twelfth, and fourteenth signal lines 502, 505, 509, 512, and 514, the first through the fifth exclusive-OR'ed bits are produced as the second, the fifth, the ninth, the twelfth, and the fourteenth output bits s(2), s(5), s(9), s(12), and s(14). Through third and fourth signal lines 503 and 504, the first OR'ed bit is produced as the third and the fourth output bits s(3) and s(4). The second OR'ed bit is produced through sixth through eighth signal lines 506, 507, and 508 as the sixth through the eighth output bits s(6), s(7), and s(8). Similarly, the third OR'ed bit is produced through tenth and eleventh signal lines 510 and 511 as the tenth and the eleventh output bits s(10) and s(11). Likewise, the fourth OR'ed bit is produced through a thirteenth signal line 513 as the thirteenth output bit s(13). The fifth OR'ed bit is produced through a fifteenth signal line 515 as the fifteenth output bit s(15). The zeroth through the fifteenth signal lines 500 to 515 collectively serve as a producing arrangement coupled to the preprocessing circuit 22, the OR circuit 26a, and the exclusive OR circuit 28a producing a combination of the least significant bit alone of the preprocessed signal, the OR'ed output signal, and the exclusive-OR'ed output signal collectively as the sum signal S.

Reviewing FIG. 1 and FIGS. 8 to 14, it will be understood that the summing circuit 20 is applicable to addition of the input data signals A(0) through A(n). In this event, the output bits s(0) to s(m) are generally given by zeroth through m-th Boolean expressions:

$$s(0) = a(0),$$
$$\ldots,$$
$$s(p(1) - 1) = a(0),$$
$$s(p(1)) = a(1) \oplus a(0),$$
$$s(p(1) + 1) = a(1) + a(0),$$
$$\ldots,$$
$$s(p(2) - 1) = a(1) + a(0),$$
$$s(p(2)) = a(2) \oplus (a(1) + a(0)),$$
$$s(p(2) + 1) = a(2) + a(1) + a(0),$$
$$\ldots,$$
$$s(p(n-1) - 1) = a(n-2) + \ldots + a(0),$$
$$s(p(n-1)) = a(n-1) \oplus (a(n-2) + \ldots + a(0)),$$
$$s(p(n-1) + 1) = a(n-1) + a(n-2) + \ldots + a(0),$$
$$\ldots,$$
$$s(p(n) - 1) = a(n-1) + \ldots + a(0),$$
$$s(p(n)) = a(n) \oplus (a(n-1) + \ldots + a(0)),$$
$$s(p(n) + 1) = a(n) + a(n-1) + \ldots + a(0),$$
$$\ldots,$$
$$\text{and} \quad s(m) = a(n) + a(n-1) + \ldots + a(0).$$

Figures 15, 16:
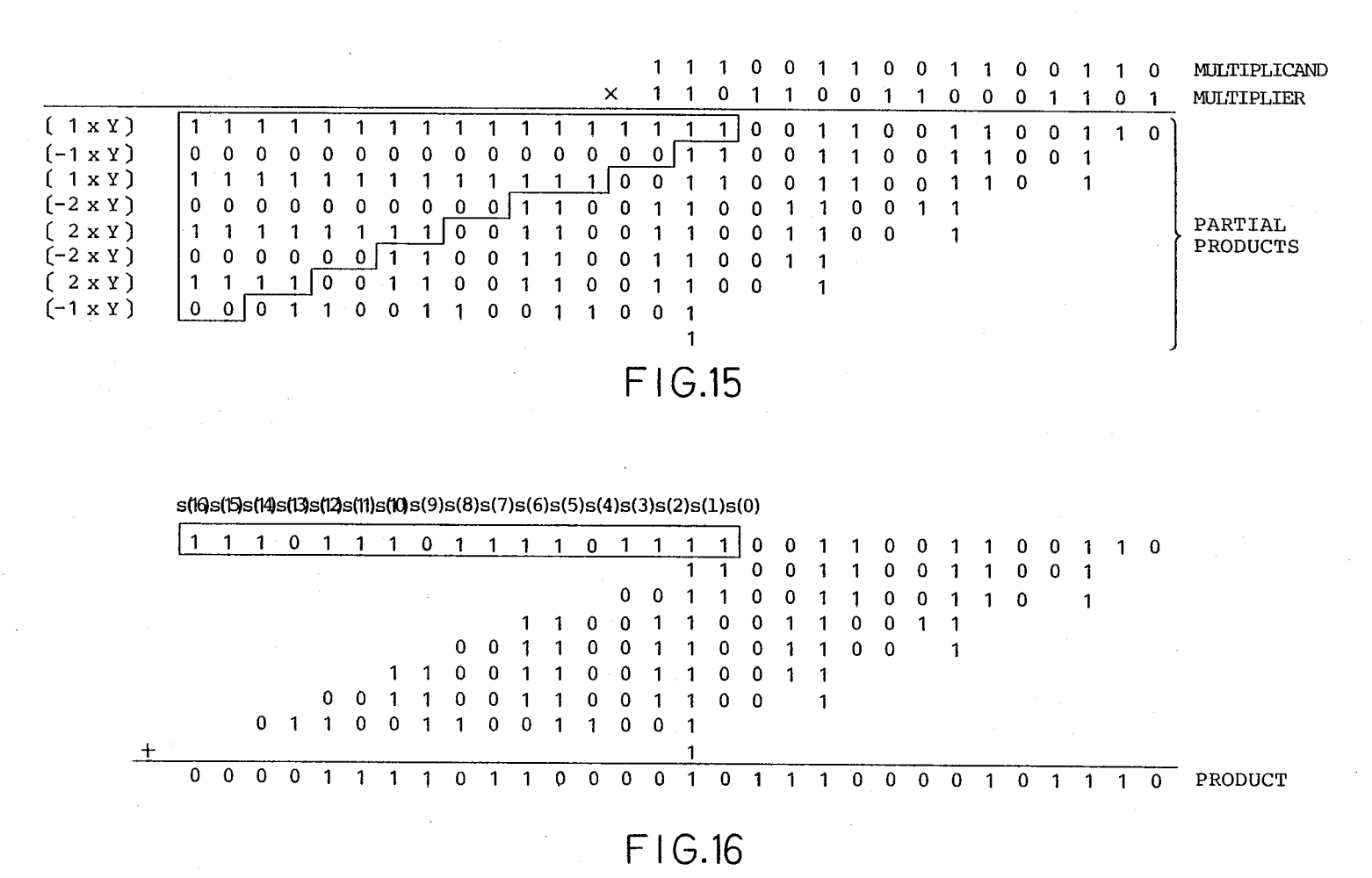

Turning to FIGS. 15 and 16, the description will proceed to another practical operation of the summing circuit 20 thus far described with reference to FIG. 1 and FIGS. 8 through 14. It will be assumed as follows. The first predetermined natural number n is equal to seven. The second predetermined natural number m is equal to sixteen. The predetermined integer k is equal to thirteen. The zeroth through the seventh discrete integers p(0), p(1), p(2), p(3), p(4), p(5), p(6), and p(7) are equal to zero, two, four, seven, nine, eleven, thirteen, and fifteen. The summing circuit 20 is used on calculating a product of a multiplicand and a multiplier which are equal to decimal (−6554) and (−9843).

Upon calculating the product, the multiplicand and the multiplier are converted to first and second binary numbers in the known manner. Each of the first and second binary number is represented by sixteen digits. More particularly, the multiplicand (the first binary number) is represented by binary 1110 0110 0110 0110.

The multiplier (the second binary number) is given by binary 1101 1001 1000 1101.

In this example, the predetermined integer k is equal to thirteen. This is because the same logic level is shared in common in the multiplicand by the two bits next following the sign bit on a less significant side and the sign bit which may be called a true sign bit. The next following two bits may be considered as provisional sign bits similar to the true sign bit. Inasmuch as the most significant bit of the product is generally a digit $2^{m+k}$ and of $2^{29}$ in the example being illustrated, the second natural number m is equal to twenty-nine minus thirteen, namely, sixteen. As mentioned in conjunction with FIG. 8, the first predetermined number n is less than a half of the second predetermined natural number m and may therefore be seven.

In the manner known in the art, the product is calculated by the use of Booth algorithm known in the art. By the use of the Booth algorithm, zeroth through seventh multiplying factors are generated from the multiplier (the second binary number). The zeroth through the seventh multiplying factors are equal to (1), (−1), (1), (−2), (2), (−2), (2), and (−1). By multiplying the multiplicand (the first binary number) by the zeroth through the seventh multiplying factors are given zeroth through seventh partial products depicted in FIG. 15. When the multiplying factor is negative, the logic one value is added to a least significant bit of the respective partial product. Each partial product has a sign bit which is extended or compensated towards a most significant bit.

In FIG. 15, a part of the partial products is surrounded by a solid line as a surrounded part which is represented by the first term on the right-hand side of Equation (2) when the first predetermined natural number n, the second predetermined natural number m, the predetermined integer k, and the zeroth through the seventh discrete integers p(0) to p(7) are equal to seven, sixteen, thirteen, zero, two, four, seven, nine, eleven, thirteen, and fifteen, respectively, as mentioned above. The partial products enclosed with the solid line will be called main partial products. Those outwardly of the main partial products will be referred to as modified partial products.

More specifically, the zeroth through the seventh input data signals A(0) to A(7) are given by:

A(0)=1111 1111 1111 1111 1000 0000 0000 00,
A(1)=0000 0000 0000 0000 0000 0000 0000 00,
A(2)=1111 1111 1111 1000 0000 0000 0000 00,
A(3)=0000 0000 0000 0000 0000 0000 0000 00,
A(4)=1111 1111 0000 0000 0000 0000 0000 00,
A(5)=0000 0000 0000 0000 0000 0000 0000 00,
A(6)=1111 0000 0000 0000 0000 0000 0000 00,
and A(7)=0000 0000 0000 0000 0000 0000 0000 00.

Accordingly, the zeroth through the seventh coefficients are given by:

a(0)=1,
a(1)=0,
a(2)=1,
a(3)=0,
a(4)=1,
a(5)=0,
a(6)=1, and a(7)=0.

By the use of the summing circuit 20, zeroth through sixteenth output bits s(0) to s(16) of the sum signal S are given by:

s(0)=1,
s(1)=1,
s(2)=1,
s(3)=1,
s(4)=0,
s(5)=1,
s(6)=1,
s(7)=1,
s(8)=1,
s(9)=0,
s(10)=1,
s(11)=1,
s(12)=1,
s(13)=0,
s(14)=1,
s(15)=1,
and s(16)=1.

Accordingly, it is easily possible to calculate the sum signal S which composes a part of the product and is surrounded by another solid line in FIG. 16. In addition, it is possible to separate the modified partial products from the partial products. As a result, the product is calculated in the manner by a total sum of the sum signal S and the modified partial products. In the example being illustrated, the product of the multiplicand and the multiplier is equal to binary 00 0011 1101 1000 0101 1100 0010 1110 which is equal to decimal 64511022.

What is claimed is:

1. A summing circuit for summing up zeroth through n-th input data signals to produce a sum signal, where n represents a first predetermined natural number, each of said zeroth through said n-th input data signals consisting of (m+k+1) bit arranged from a most significant bit $2^{m+k}$ to a least significant bit $2^0$, where m represents a second predetermined natural number and k represents a predetermined integer which is not less than zero, said sum signal consisting of (m+1) bits arranged from said most significant bit $2^{m+k}$ to a k-th bit $2^k$ as counted from said least significant bit $2^0$, said summing circuit comprising:

preprocessing means responsive to said zeroth through said n-th input data signals for preprocessing said zeroth through said n-th input data signals to a preprocessed signal which is (n+1) bits arranged from a most significant bit $2^n$ to a least significant bit $2^0$, said least through said most significant bits $2^0$ to $2^n$ of the preprocessed signal being equal to the most significant bits $2^{m+k}$ of said zeroth through said n-th input data signals, respectively; and logical operation means coupled to said preprocessing means for carrying out a logical operation on said preprocessed signal to produce said sum signal.

2. A summing circuit as claimed in claim 1, said first predetermined natural number being greater than one and equal to said second predetermined natural number, wherein said logical operation means comprises:

OR operation means coupled to said preprocessing means for carrying out an OR operation on the n bits of said preprocessed signal except for the most significant bit $2^n$ of said preprocessed signal to produce an OR'ed output signal which is (n−1) bits long;

exclusive-OR operation means coupled to said preprocessing means and said OR operation means for carrying out an exclusive-OR operation on said preprocessed signal and said OR'ed output signal to produce an exclusive-OR'ed output signal which is n bits long; and producing means coupled to said preprocessing means and said exclusive-OR operation means for producing said exclusive-OR'ed output signal and the least significant bit $2^0$ of said preprocessed signal as said sum signal.

3. A summing circuit as claimed in claim 2, each of said zeroth through said n-th input data signals being given by an equation:

$$A(d) = a(d) \times \sum_{i=d}^{m} 2^{i+K} + A \times \sum_{i=0}^{K+d-1} 2^i,$$

where d represents a first integer consecutively varying from zero to said first predetermined natural number, A(d) represents a d-th input data signal among said zeroth through said n-th input data signals, a(d) represents a d-th coefficient having one of logic zero and one value, and A represents a common coefficient having a logic zero value, said sum signal consisting of zeroth through n-th output bits s(0) to s(n), wherein:

said preprocessing means is for producing said d-th coefficient as a d-th processed bit of said preprocessed signal;

said OR operation means comprising an e-th OR gate where e represents a second integer consecutively varying from one to said first predetermined natural number less one, said e-th OR gate being responsive to the zeroth through the e-th processed bits for producing an e-th OR'ed bit of said OR'ed output signal;

said exclusive-OR operation means comprising a first and an f-th exclusive OR gate where f represents a third integer consecutively varying from two to said first predetermined natural number, said first exclusive OR gate being responsive to the zeroth processed bit and the first processed bit for producing a first exclusive-OR'ed bit of said exclusive-OR'ed output signal, said f-th exclusive OR gate being responsive to the (f−1)-th OR'ed bit and the f-th processed bit for producing an f-th exclusive-OR'ed bit of said exclusive-OR'ed output signal; and said producing means being for producing said zeroth processed bit as said zeroth output bit s(0) and said first through said n-th exclusive-OR'ed bits as said first through said n-th output bits s(1) to s(n).

4. A summing circuit as claimed in claim 1, said first predetermined natural number being greater than one and equal to said second predetermined natural number, each of said zeroth through said n-th input data signals being given by an equation:

$$A(d) = a(d) \times \sum_{i=d}^{n} 2^{i+k} + A \times \sum_{i=0}^{k+d-1} 2^i,$$

where d represents a first integer consecutively varying from zero to said first predetermined natural number, A(d) represents a d-th input data signal among said zeroth through said n-th input data signals, a(d) represents a d-th coefficient having one of logic zero and one values, and A represents a common coefficient having a logic zero value, said sum signal consisting of zeroth through n-th output bits s(0) to s(n), wherein said zeroth coefficient is produced as the zeroth output bit s(0), an exclusive-OR'ed bit of said first and said zeroth coefficients being produced as the first output bit s(1), and an exclusive-OR'ed bit of said d-th coefficient and an OR'ed bit of said zeroth through said (d−1)-th coefficients being produced as each of the d-th output bits s(d) when said first integer is equal at least to two.

5. A summing circuit as claimed in claim 1, said first predetermined natural number being greater than one and less than a half of said second predetermined natural number, wherein said logical operation means comprises:

OR operation means coupled to said preprocessing means for carrying out an OR operation on said preprocessed signal to produce an OR'ed output signal which consists of n bits arranged from a most significant bit $2^{n-1}$ to a least significant bit $2^0$;

exclusive-OR operation means coupled to said preprocessing means and said OR operation means for carrying out an exclusive-OR operation on said preprocessed signal and (n−1) bits of said OR'ed output signal except for the most significant bit $2^{n-1}$ of said OR'ed output signal to produce an exclusive-OR'ed output signal which is n bits long; and producing means coupled to said preprocessing means, said OR operation means, and said exclusive-OR operation means for producing the least significant bit $2^0$ alone of said preprocessed signal, said OR'ed output signal, and said exclusive-OR'ed output signal collectively as said sum signal.

6. A summing circuit as claimed in claim 5, each of said zeroth through said n-th input data signals being given by an equation:

$$A(d) = a(d) \times \sum_{i=p(d)}^{m} 2^{i+K} + A \times \sum_{i=0}^{K+p(d)-1} 2^i,$$

where d represents a first integer consecutively varying from zero to said first predetermined natural number, A(d) represents a d-th input data signal among said zeroth through said n-th input data signals, a(d) represents a d-th coefficient having one of logic zero and one values, A represents a common coefficient having a logic zero value, and p(n) represents zeroth through n-th discrete integers which are discontinuously preselected so that the zeroth discrete integer is equal to zero, the first discrete integer p(1) is not less than two, the n-th discrete integer p(n) is not greater than said second predetermined natural number less one, and the second through the (n−1)-th discrete integers successively increase, each of the second through the (n−1)-th discrete integers being different from each of the (d−1)-th and the (d+1)-th discrete integers by at least two, said sum signal consisting of zeroth through m-th output bits s(0) to s(m), wherein:

said preprocessing means is for producing d-th coefficient as a d-th processed bit of said preprocessed signal;

said OR operation means comprising an e-th and an n-th OR gate where e represents a second integer consecutively varying from one to said first predetermined natural member less one, said e-th OR gate being responsive to the zeroth through the e-th processed bits for producing an e-th OR'ed bit of said OR'ed output signal, said n-th OR gate being responsive to the zeroth through the n-th processed bits for producing an n-th OR'ed bit of said OR'ed output signal;

said exclusive operation means comprising a first and an f-th exclusive OR gate where f represents a third integer consecutively varying from two to said first predetermined natural number, said first exclusive OR gate being responsive to the zeroth and the first processed bits for producing a first exclusive-OR'ed bit of said exclusive-OR'ed output signal, said f-th exclusive OR gate being responsive to the (f−1)-th OR'ed bit and the f-th processed bit for producing an f-th exclusive-OR'ed bit of said exclusive-OR'ed output signal; and said producing means being for producing said zeroth processed bit as each of the zeroth through the (p(1)−1)-th output bits s(0) to s(p(1)−1), the first exclusive-OR'ed bit as the p(1)-th output bit s(p(1)), the e-th OR'ed bits as each of the (p(e) +1)-th through (p(e+1)−1)-th output bit s(p(e)+1) to s(p(e+1)−1), the f-th exclusive-OR'ed bit as the p(f)-th output bit s(p(f)), and said n-th OR'ed bit as each of the (p(n)+1)-th through said m-th output bits s(p(n)+1) to s(m).

7. A summing circuit as claimed in claim 1, said first predetermined natural number being greater than one and less than a half of said second predetermined natural number, each of said zeroth through said n-th input data signals being given by an equation:

$$A(d) = a(d) \times \sum_{i=p(d)}^{m} 2^{i+k} + A \times \sum_{i=0}^{k+p(d)-1} 2^i,$$

where d represents a first integer consecutively varying from zero to said first predetermined natural number, A(d) represents a d-th input data signal among said zeroth through said n-th input data signals, a(d) represents a coefficient having one of logic zero and one values, A represents a common coefficient having a logic zero value, and p(d) represents zeroth through n-th discrete integers which are discontinuously preselected so that the zeroth discrete integer is equal to zero, the first discrete integer p(1) is not less than two, the n-th discrete integer p(n) is not greater than said second predetermined natural number less one, and the second through the (n−1)-th discrete integers successively increase, each of the second through the (n−1)-th discret integers being different from each of the (d−1)-th and the (d+1)-th discrete integers by at least two, said sum signal consisting of zeroth through m-th output bits s(0) to s(m), wherein said zeroth coefficient is produced as each of the zeroth through the (p(1)−1)-th output bits s(0) to s(p(1)−1), an exclusive-OR'ed bit of said first and said zeroth coefficients being produced as the p(1)-th output bit s(p(1)), an OR'ed bit of said zeroth through said (d−1)-th coefficients being produced as each of the (p(d−1)+1)-th through the (p(d)−1)-th output bits s(p(d−1)+1) to s(p(d)−1) when said first integer is equal at least to two, an exclusive-OR'ed bit 35 of said d-th coefficient and an OR'ed bit of said zeroth through said (d−1)-th coefficients being produced as each of the p(d)-th output bits s(p(d)) when said first integer is equal at least to two, and an OR'ed bit of said zeroth through said n-th coefficients being produced as each of the (p(n)+1)-th through the m-th output bits s(p(n)+1) to s(m).

* * * * *